United States Patent
Garudadri et al.

(10) Patent No.: US 8,379,716 B2
(45) Date of Patent: Feb. 19, 2013

(54) METHOD, APPARATUS, AND SYSTEM FOR ENHANCING ROBUSTNESS OF PREDICTIVE VIDEO CODECS USING A SIDE-CHANNEL BASED ON DISTRIBUTED SOURCE CODING TECHNIQUES

(75) Inventors: Harinath Garudadri, San Diego, CA (US); Naveen B. Srinivasamurthy, San Diego, CA (US); Hyukjune Chung, San Diego, CA (US); Kannan Ramachandran, El Cerrito, CA (US); Abhik Majumdar, Berkeley, CA (US)

(73) Assignee: Qualcomm Incorporated, San Diego, CA (US)

( * ) Notice: Subject to any disclaimer, the term of this patent is extended or adjusted under 35 U.S.C. 154(b) by 561 days.

(21) Appl. No.: 12/120,906

(22) Filed: May 15, 2008

(65) Prior Publication Data

US 2008/0267288 A1 Oct. 30, 2008

Related U.S. Application Data

(62) Division of application No. 11/140,086, filed on May 27, 2005.

(60) Provisional application No. 60/576,193, filed on Jun. 1, 2004.

(51) Int. Cl.
H04N 7/12 (2006.01)
H04N 11/02 (2006.01)
H04N 11/04 (2006.01)

(52) U.S. Cl. .................................. 375/240.12
(58) Field of Classification Search ............. 375/240.12
See application file for complete search history.

(56) References Cited

U.S. PATENT DOCUMENTS

| 4,191,970 | A | | 3/1980 | Witsenhausen et al. |
| 4,829,526 | A | * | 5/1989 | Clark et al. ................... 714/762 |
| 4,860,308 | A | * | 8/1989 | Kamerman et al. .......... 375/222 |
| 4,884,263 | A | * | 11/1989 | Suzuki ......................... 370/225 |
| 5,416,779 | A | * | 5/1995 | Barnes et al. ................. 370/280 |
| 5,440,345 | A | * | 8/1995 | Shimoda ................. 375/240.14 |
| 5,481,553 | A | * | 1/1996 | Suzuki et al. ................. 714/800 |
| 5,588,067 | A | * | 12/1996 | Peterson et al. .............. 382/103 |
| 5,734,783 | A | * | 3/1998 | Shimoda et al. ................ 386/68 |
| 5,751,893 | A | * | 5/1998 | Shimoda et al. .............. 386/111 |
| 5,784,572 | A | * | 7/1998 | Rostoker et al. .............. 709/247 |
| 5,862,295 | A | * | 1/1999 | Shimoda et al. ................ 386/68 |
| 5,987,181 | A | * | 11/1999 | Makiyama et al. ........... 382/239 |
| 6,009,230 | A | * | 12/1999 | Shimoda et al. ................ 386/68 |

(Continued)

FOREIGN PATENT DOCUMENTS

| CN | 1022408 | 11/1998 |
| CN | 1224299 | 7/1999 |

(Continued)

OTHER PUBLICATIONS

Sehgal, A.; Jagmohan, A.; Ahuja, N.; A State-Free Casual Video Encoding Algorithm; IEEE 2003, pp. I-605 to I-608.*

(Continued)

*Primary Examiner* — Joseph D Torres
(74) *Attorney, Agent, or Firm* — Steve Thiel; Brent Boyd

(57) ABSTRACT

A method, apparatus, and system for providing distributed source coding techniques that improve data coding performance, such as video data coding, when channel errors or losses occur. Errors in the reconstruction of the data is eliminated or reduced by sending extra information. Correlation between a predicted sequence and an original sequence can be used to design codebooks and find the cosets required to represent the original image. This information may be sent over another channel, or a secondary channel.

28 Claims, 12 Drawing Sheets

U.S. PATENT DOCUMENTS

| | | | |
|---|---|---|---|
| 6,014,493 A * | 1/2000 | Shimoda | 386/68 |
| 6,038,371 A * | 3/2000 | Shimoda et al. | 386/111 |
| 6,317,462 B1 * | 11/2001 | Boyce | 375/240.27 |
| 6,353,629 B1 | 3/2002 | Pal | |
| 6,564,658 B2 | 5/2003 | Pchelnikov et al. | |
| 6,577,648 B1 * | 6/2003 | Raisanen et al. | 370/503 |
| 6,577,682 B1 * | 6/2003 | Brightwell et al. | 375/240.24 |
| 6,674,802 B2 | 1/2004 | Knee et al. | |
| 6,754,203 B2 * | 6/2004 | Wah et al. | 370/352 |
| 6,778,558 B2 * | 8/2004 | Balachandran et al. | 370/470 |
| 6,876,701 B1 * | 4/2005 | Chujoh et al. | 375/240.08 |
| 6,888,888 B1 | 5/2005 | Tu et al. | |
| 7,000,174 B2 * | 2/2006 | Mantha et al. | 714/790 |
| 7,012,962 B1 | 3/2006 | Cho et al. | |
| 7,139,964 B2 * | 11/2006 | Shen et al. | 714/758 |
| 2002/0003793 A1 * | 1/2002 | Poppe et al. | 370/352 |
| 2002/0012361 A1 | 1/2002 | Houtepen et al. | |
| 2002/0054645 A1 | 5/2002 | Takishima et al. | |
| 2004/0194008 A1 * | 9/2004 | Garudadri et al. | 714/821 |
| 2005/0268200 A1 * | 12/2005 | Garudadri et al. | 714/746 |
| 2008/0267288 A1 * | 10/2008 | Garudadri et al. | 375/240.12 |

FOREIGN PATENT DOCUMENTS

| | | |
|---|---|---|
| CN | 1335979 | 2/2002 |
| KR | 20020064783 | 9/2002 |
| WO | WO95023487 | 8/1995 |
| WO | 9841028 | 9/1998 |
| WO | 02060184 A1 | 8/2002 |
| WO | 2004086631 | 7/2004 |

OTHER PUBLICATIONS

Anshul Sehgal, Ashish Jagmohan, and Narendra Ahuja, Wyner—Ziv Coding of Video: An Error-Resilient Compression Framework, IEEE Transactions on Multimedia, vol. 6, No. 2, Apr. 2004.*

Abhik Majumdar, Jim Chou and Kannan Ramchandran, Robust Distributed Video Compression based on Multilevel Coset Codes, IEEE, 2003, pp. 845-849.*

S. Sandeep Pradhan and Kannan Ramchandran, Distributed Source Coding Using Syndromes (DISCUS): Design and Construction, IEEE Transactions on Information Theory, vol. 49, No. 3, Mar. 2003.*

Aaron A. et al, "Wyner-Ziv coding of motion video." Institute of Electrical and Electronics Engineers, Nov. 3, 2002, Conference Record of the 36th. Asilomar Conference on Signals, Systems, & Computers. Pacific Grove, CA, Nov. 3-6, 2002, IEEE, pp. 240-244, XP010638209.

Aaron, A. et al.: "Wyner-Ziv Coding of Video: Applications to compression and error resilience," Proc. IEEE Data Compression Conf., 2003.

Abousleman G. P.-Ed-Cohen C. J., "Channel-optimized video coding for low-power wireless applications" Applied Imagery Pattern Recognition Workshop, Apr. 30, 2001, Washington, DC, USA. Oct. 10-12, 2001, Los Alamitos, CA, USA, IEEE Comput. Soc, USA, Oct. 10, 2001, pp. 163-168.

ISO/IEC 14496-2 (Part 2—Visual) Coding of Audio-Visual Objects, Dec. 1999.

Kondi L. P. et al., "On video SNR scalability". Image Processing, 1998. ICIP 98. Proceedings. 1998 International Conference on Chicago, IL, USA Oct. 4-7, 1998, pp. 934-938, XP010586945 ISBN:0-8186-8821-1.

Lee B. R. et al., "H.263-Based SNR Scalable Video Codec" IEEE Transactions on Consumer Electronics, IEEE Inc. NewYork, vol. 43, No. 3 Aug. 1, 1997, pp. 614-622, XP000742539 ISSN: 0098-3063.

Majumdar A et al Institute of Electrical and Electronics Engineers: "Robust distributed video compression based on multilevel coset codes" Conference Recprds of the 37th. Asilomar Conference on Signals, Systems, & Computers. Pacific Groove, CA, IEEE Nov. 9-12, 2003, XP010701850. vol. 1, conference 37, pp. 845-849.

Majumdar A et al: "Drift Reduction in Predictive Video Transmission using a Distributed Source Coded Side-Channel" Proceedings of the 12th Annual ACM International Conference on Multimedia, Oct. 10, 2004, pp. 404-407, XP002357497.

Pradhan, S. S. et al.: "Distributed Source Coding Using Syndromes (DISCUS): Design and Construction," IEEE Data Compression Conference, pp. 1-10, Mar. 1999.

R. Zhang et al.: "Optimal intra/inter mode switching for robust video communication over the Internet," in Proc. 33rd Ann. Asilomar Conf. on Sig. Syst. Comp., Oct. 1999, pp. 332-336.

Sankur B. et al., "Two -Layer Coding for Videotelephone." Signal Processing, Image Communication, Elsevier Science Publishers, Amsterdam, NL. vol. 5, No. 4, Oct. 1, 1993, pp. 295-303, XP000398934 ISSN: 0923-5965.

Vetro A. et al., "True Motion Vectors for Robust Video Transmission" Jan. 1999, Proceedings of the SPIE, SPIE, Bellingham, VA pp. 230-240, XP000904924 ISSN: 0277-786X.

International Search Report—PCT/US2005/019157, International Search Authority—European Patent Office—Jan. 18, 2006.

Written Opinion—PCT/US2005/019157, International Search Authority—European Patent Office—Jan. 18, 2006.

Hannuksela, M., et al. "Sup-Picture: ROI Coding and Unequal Error Protection", IEEE International Conference on Image Processing ICIP 2002, Rochester New York, Sep. 22, 2002 XP010607773; p. 537-540.

Puri R., et al. "PRISM: A New Roust Video Coding Architecture Based on Distributed Compression Principles", Proceeding of the Annual Allerton Conference on Communication, Control and Computing, XP0080505800, 2002; pp. 586-595.

Sehgal et al., "Wyner-Ziv Coding of Video: An Error-Resilient Compression Framework", IEEE Transactions Multimedia, vol. 6, Apr. 2004, XP002342568, pp. 249-258.

Wyner, A., et al., "The Rate-Distortion Function for Source Coding with Side Information at the Decoder", IEEE Transactions on Information Theory, vol. IT-22, Jan. 1976, XP002342569, pp. 1-10.

Yingiun, S., et al. "Joint source-channel coding for image transmission over noisy channels" Comm. Tech Proceedings 2000, WCCC-ICCT-2000, International Conference in China, Aug. 21-25,, XP010526729, pp. 136-139.

Aaron, A., "Systematic lossy forward error protection for video waveforms", Proceeding 2003 International Conference on Image Processing, ICIP-2003, Barcelona, Spain, Sep. 14, 2003; XP010669930; pp. 609-612.

Sehgal, A.; Jahmohan, A.; Ahuja, N.; A State-Free Causal Video Encoding Algorithm; IEEE 2003, pp. I-605 to I-608.

Aaron, A., Rane S., Setton, E., Girod, B: Transform-domain Wyner-Ziv codec for video. In: Proc. SPIE Visual Communications and Image Processing, San Jose, CA (Jan. 21, 2004).

Angelos D. Liveris et al., "A distributed source coding technique for highly correlated images using turbo-codes," Proceedings of 2002 IEEE International Conference on Acoustics, Speech, and Signal Processing, May 2002, vol. 4, pp. IV-3261 to IV-3264 (in particular, refer to the sections "1. Introduction" "2. Modulo Encoding").

International Search Report and Written Opinion—PCT/US2004/008950, International Search Authority—European-Patent-Office—Apr. 22, 2005.

Jagmohan A., et al., "Predictive encoding using coset codes," Proceedings of 2002 International Conference on Image Processing, Rochester, New York, Sep. 2002, vol. 2, pp. II-29-II-32.

Jan Bajcsy et al., "Coding for the Slepian-Wolf Problem With Turbo Codes," IEEE Global Telecommunications Conferences, San Antonio, Texas, Nov. 2001, vol. 2, pp. 1400-1404.

Pradhan S S et al: "Distributed source coding using syndromes (DISCUS): design and construction" Data Compression Conference, 1999. Proceedings. DCC '99 Snowbird, UT, USA Mar. 29-31, 1999, Los Alamitos, CA, USA, IEEE Comput. Soc, US, Mar. 29, 1999, pp. 158-167, XP010329040.

Wolf J.,et al., "Noiseless coding of correlated information sources," IEEE Transactions on Information Theory, 1973, vol. 19 (4), 471-480.

* cited by examiner

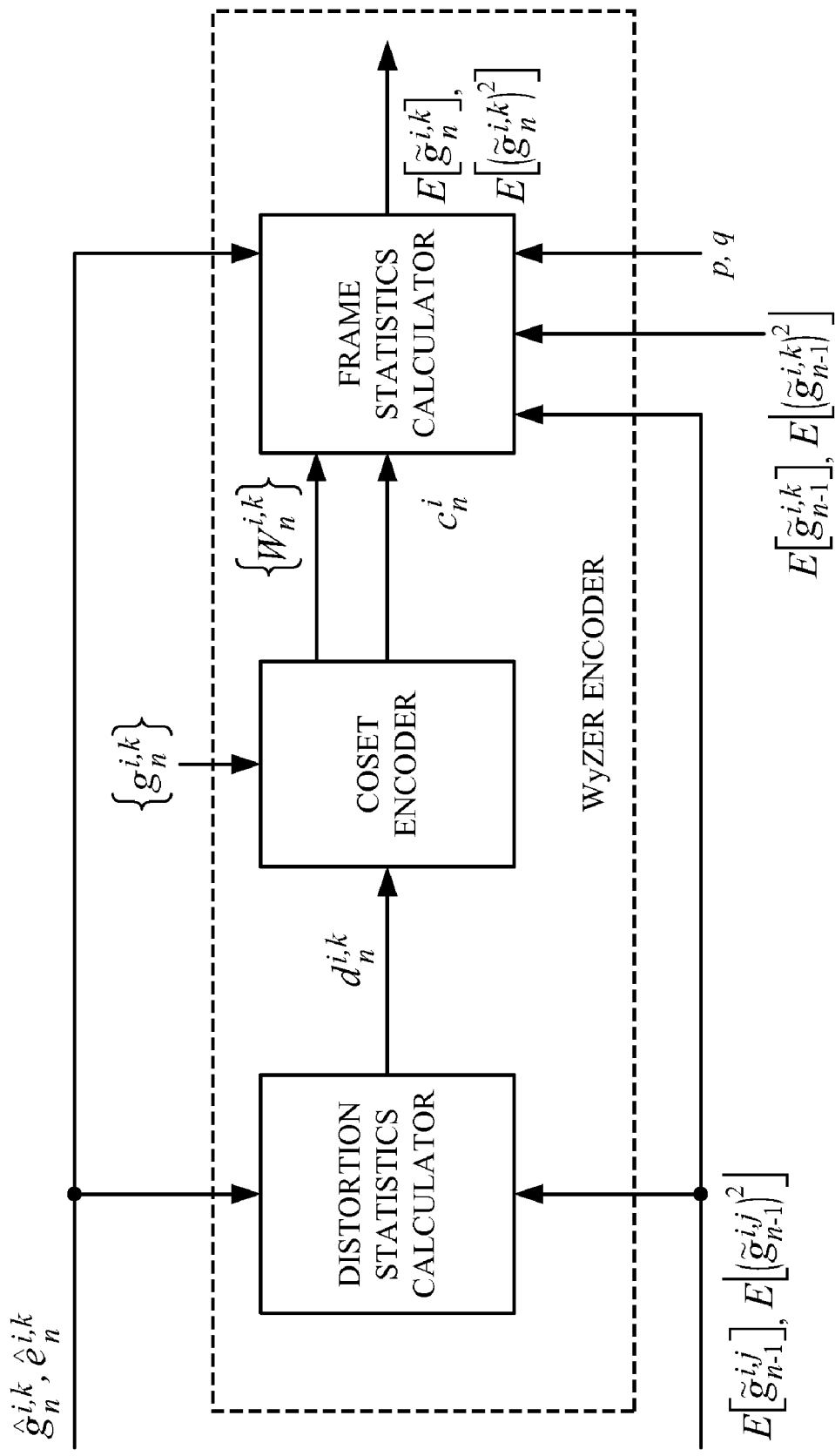
FIG. 6: WyZER ENCODER

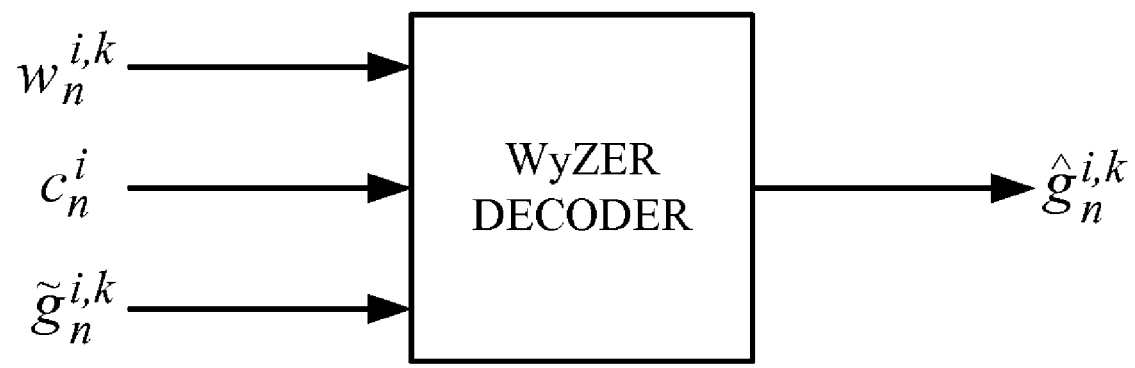
FIG. 7: WyZER DECODER

METHOD, APPARATUS, AND SYSTEM FOR ENHANCING ROBUSTNESS OF PREDICTIVE VIDEO CODECS USING A SIDE-CHANNEL BASED ON DISTRIBUTED SOURCE CODING TECHNIQUES

CLAIM OF PRIORITY UNDER 35 U.S.C. §119

The present Application for Patent is a divisional of patent application Ser. No. 11/140,086, filed May 27, 2005, which claims priority to U.S. Provisional Application No. 60/576,193, entitled "METHOD, APPARATUS, AND SYSTEM FOR ENHANCING ROBUSTNESS OF PREDICTIVE VIDEO CODECS USING A SIDE-CHANNEL BASED ON DISTRIBUTED SOURCE CODING TECHNIQUES", filed Jun. 1, 2004, and assigned to the assignee hereof and hereby expressly incorporated by reference, in its entirety, herein.

REFERENCE TO CO-PENDING APPLICATIONS FOR PATENT

The present application for patent is related to the following co-pending U.S. patent application Ser. No. 10/396,982, entitled "Method, Apparatus and System for Encoding and Decoding Side Information for Multimedia Transmission" filed Mar. 24, 2003, assigned to the assignee hereof, and expressly incorporated by reference herein.

BACKGROUND

I. Field

The present invention relates generally to multimedia over error-prone networks, and more specifically to video coding and decoding techniques used in conjunction with multimedia over wireless networks.

II. Background

Current video compression techniques, such as, ITU-T H.263, H.263+, H.263++, ISO MPEG-4 and JVT H.264 have become increasingly efficient in compressing video. The ability to achieve good visual quality at relatively low bitrates has led to increased popularity of video applications in emerging multimedia applications over bandwidth limited channels, such as, wireless channels. However, the predictive nature of compression techniques employed by current video codecs makes the compressed video bit-streams very fragile and susceptible to degradation due to packet losses in the channel.

Channel errors or packet loss can lead to loss of synchronization between a video encoder and a decoder. More specifically, a locally decoded copy of a reconstructed video frame at the encoder may not match the corresponding reconstructed video frame at the decoder. This loss of synchronization between a video encoder and a decoder is also sometimes termed "drift" since there will be a drift between the receiver's decoder and the sender's decoder. Drift can lead to significant losses in decoded video quality.

The reduction in decoded quality due to a drift is a direct consequence of the prediction-based coding that underlies current video codecs. That is, to currently decode the current video frame, all previous video frames need to have been reconstructed correctly. This problem is exacerbated in a wireless channel where packet losses are far more frequent than in a wire-line network and tend to occur in bursts.

Re-transmission schemes, such as Automatic Repeat Request (ARQ), or Forward Error Correction (FEC) schemes have been used to combat drift problems between the encoder and decoder and thereby alleviate the loss in quality due to packet losses. However, using ARQ or FEC schemes (or a combination of both) may not prove effective since the latency constraints of the video application may preclude the use of such schemes. Moreover, FEC-based schemes cannot guarantee that the data will be received and if it is not, the drift continues until the next intra-frame[1] is received.

[1] An intra-frame is used by video encoders to break the prediction loop and hence stop drift.

The Wyner-Ziv Theorem is discussed in A. D. Wyner and J. Ziv, "The rate distortion function for source coding with side information at the decoder," *IEEE Trans. Inf. Theory, vol.* 22, pp. 1-10, January 1976. This Theorem addresses the problem of source coding with side-information. Consider two correlated sources X and Y. The encoder needs to compress the source X when only the decoder has access to the source Y. When the mean squared error is the distortion measure and X=Y+N where N has a Gaussian distribution, the rate—distortion performance for coding X is the same whether or not the encoder has access to Y.

Recently, based on the principles of source coding with side-information within a Wyner-Ziv framework joint source-channel coding techniques have been proposed to address the problem of drift. See, for example, R. Puri and K. Ramchandran, "PRISM: A New Robust Video Coding Architecture based on Distributed Compression Principles," in *Allerton Conference on Communication, Control and Computing*, 2002; A. Sehgal, A. Jagmohan, and N. Ahuja, "Wyner-ziv Coding of Video: An Error-Resilient Compression Framework," *IEEE Trans. on Multimedia*, vol. 6, pp. 249-258, 2004; A. Aaron, S. Rane, R. Zhang, and B. Girod, "Wyner-Ziv Coding of Video: Applications to compression and error resilience," in *Proc. IEEE Data Compression Conf.*, 2003; and A. Aaron, S. Rane, D. Rebollo-Monedero, and B. Girod, "Systematic Lossy Forward Error Protection for Video Waveforms," in *Proc. IEEE Int. Conf. Image Proc.*, 2003.

The codecs discussed in R. Puri and K. Ramchandran, "PRISM: A New Robust Video Coding Architecture based on Distributed Compression Principles," in *Allerton Conference on Communication, Control and Computing*, 2002; and A. Aaron, S. Rane, R. Zhang, and B. Girod, "Wyner-Ziv Coding of Video: Applications to compression and error resilience," in *Proc. IEEE Data Compression Conf.*, 2003, are full-fledged video codecs that eschew the predictive coding framework.

On the other hand, the codecs discussed in A. Sehgal, A. Jagmohan, and N. Ahuja, "Wyner-ziv Coding of Video: An Error-Resilient Compression Framework," *IEEE Trans. on Multimedia*, vol. 6, pp. 249-258, 2004; and A. Aaron, S. Rane, D. Rebollo-Monedero, and B. Girod, "Systematic Lossy Forward Error Protection for Video Waveforms," in *Proc. IEEE Int. Conf. Image Proc.*, 2003, retain the predictive coding framework but send some extra information to mitigate the effect of drift.

Notwithstanding these advances, there is a need in the art for techniques that not only enables robust video delivery over wireless channels by helping alleviate the effects of packet losses on compressed video bit-streams transmitted over such wireless channels, but also satisfies the requirements of Be able to work with existing compression techniques Have low processing latency Quickly eliminate/reduce the drift between the video encoder and decoder Require low bitrate when compared to that used by the video codec

SUMMARY OF EMBODIMENTS

Embodiments disclosed herein address the above stated needs by providing distributed source coding techniques that improve video coding performance when channel errors or packet losses occur.

The following terms are used

Main stream: video data compressed using predictive codecs

Main channel: logical channel on which Main stream is transmitted

WyZER stream: Wyner Ziv Error Resilience stream constructed using distributed coding principles Secondary channel: logical channel on which WyZER stream is transmitted Main channel encoder: encoder used to encode main stream Main channel decoder: decoder used to decode main stream WyZER encoder: encoder used to encode WyZER stream WyZER decoder: decoder used to decode WyZER stream Side information: decoded main stream data which is used by WyZER decoder to reconstruct a frame at a receiver DSC: Distributed Source Coding Correlation between a video frame at the encoder and a reconstructed video frame at the decoder in presence of channel errors is estimated. In one embodiment, the correlation is computed in the discrete cosine transform (DCT) domain. The correlation can be used in finding cosets as described in U.S. patent application Ser. No. 10/396,982, filed Mar. 24, 2003, entitled "Method, Apparatus and System for Encoding and Decoding Side Information for Multimedia Transmission."

Embodiments of the invention can help alleviate the drift problem in conventional video codecs by WyZER stream as an error resilience stream. Embodiments can help reduce or eliminate drift by sending extra information. For example, in one embodiment, a secondary channel technique can be used in which WyZER stream can be used to stop drift and improve video quality. The correlation between a predicted sequence and an original sequence can be used to design codebooks and find the cosets required to represent the original image. This information may be sent over another channel, or a secondary channel. In another embodiment, the number of cosets required can be communicated to a WyZER decoder over a secondary channel in the form of header information.

In one embodiment, using DSC, another description of the video sequence can be sent at a lower rate over a secondary channel which can be used to correct errors, caused by channel losses, in a reconstructed video frame at the receiver. The bit-stream sent over the secondary channel can be decoded with the help of the video frame reconstructed by the predictive decoder. As a result, the effects of error propagation can be mitigated.

In one embodiment, if the decoder can decode only main stream data, it will discard the additional information transmitted on the secondary channel. If the decoder can decode both streams, it will decode the main stream data first, and then use this information to decode the WyZER stream data and present a final reconstructed image to the user.

BRIEF DESCRIPTION OF THE DRAWINGS

FIG. 6 is a block diagram of the WyZER encoder

FIG. 7 is a block diagram of the WyZER decoder

DETAILED DESCRIPTION

Figure 1:
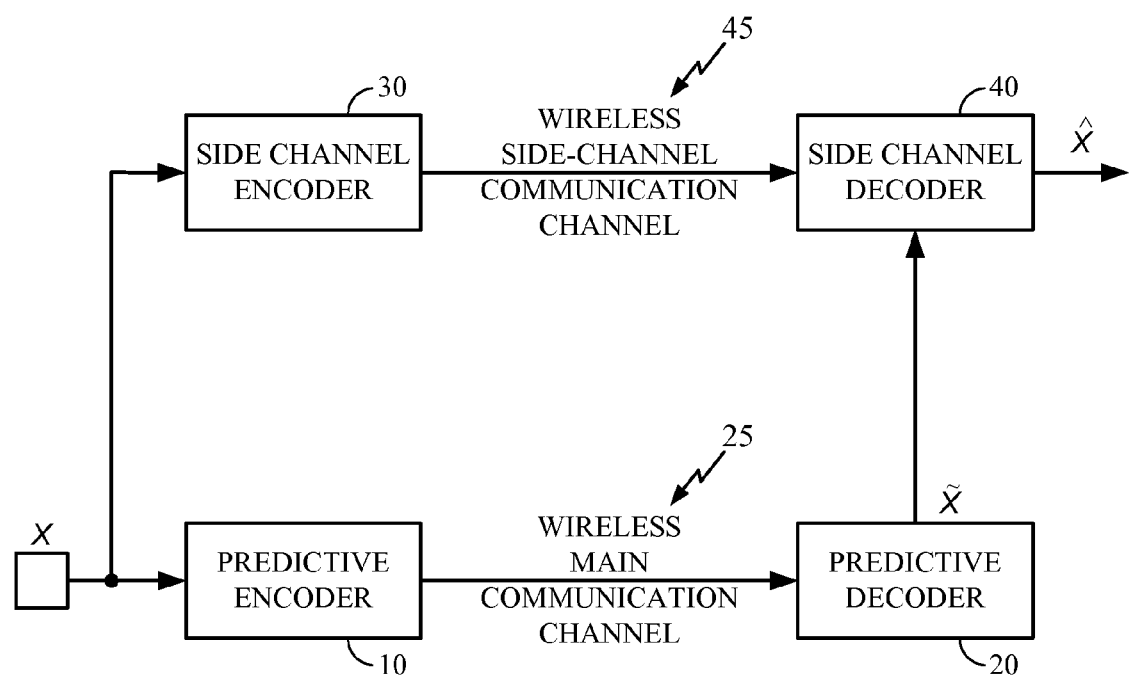
FIG. 1 is a block diagram of a wireless communication system.

Current video coding standards use a predictive framework to achieve good compression performance for video signals. Examples of such compression schemes include MPEG-4, H.263+ and H.264. However, when such compressed bitstreams are transmitted over error prone channels, the video quality is severely damaged, as demonstrated using objective PSNR metric in FIGS. 2(a)-(c). Examples of error prone channels include cdma2000®, WCDMA, GSM, and other emerging wireless networks. In this invention, video data compressed using predictive codecs is called "Main stream" and the logical channel on which main stream is transmitted is called "Main Channel".

Examples to mitigate the adverse effects of channel errors include retransmissions of transmission units with errors (RLP retransmissions, hybrid ARQ, etc.), error resilient packetization (data partitioning where semantically more important bits in transmissions units are provisioned with greater error protection, data interleaving, etc.), bitstream syntax to limit the extent of lost source data (usage of resynchronization markers, reversible variable length coding RVLC, etc.)

In this invention, a separate bitstream is created to be used along with Main stream to improve error resiliency. This stream is constructed using Wyner-Ziv coding of the video data based on Distributed Source Coding principles. We call this stream Wyner Ziv Error Resilience stream (WyZER stream). The WyZER stream is transmitted on a "Secondary channel", a logical channel that is different from the main channel used for video codecs such as MPEG-4, H.263+ and H.264. The video frame reconstructed by the predictive video coder serves as the side-information to the WyZER decoder for the purpose of decoding the WyZER stream.

According to another aspect of the invention, techniques are provided to estimate the correlation between the erroneously reconstructed frame and the frame itself in the discrete cosine transform (DCT) domain using some of the concepts detailed in R. Zhang, S. L. Regunathan, and K. Rose, "Optimal intra/inter mode switching for robust video communication over the Internet," in *Proc. 33rd Ann. Asilomar Conf. on Sig. Syst. Comp.*, 1999.

According to another aspect of the invention, the WyZER encoder operates in the DCT domain to take advantage of the energy compaction properties of the DCT. Depending upon the rate available for the side-channel and the correlation estimate, as many DCT coefficients as possible are encoded, starting from the DC and low-frequency coefficients.

If the client receives both the Main stream and the WyZER stream, but is only capable of decoding the Main stream, (i.e., it only has a predictive decoder, such as an MPEG-4 or H.263+ or H.264 decoder) then the client will only decode the Main stream and ignore the WyZER stream. A client with both a predictive decoder and a WyZER decoder, can decode both bit-streams and hence, can receive a better quality of decoded video than a client with only a predictive decoder.

While the algorithms of A. Sehgal, A. Jagmohan, and N. Ahuja, "Wyner-ziv Coding of Video: An Error-Resilient Compression Framework," *IEEE Trans. on Multimedia*, vol. 6, pp. 249-258, 2004; and A. Aaron, S. Rane, D. Rebollo-Monedero, and B. Girod, "Systematic Lossy Forward Error Protection for Video Waveforms," in *Proc. IEEE Int. Conf Image Proc.*, 2003, also use the erroneous frame reconstructed by the predictive coder as the side information at the secondary channel decoder, there are a number of important differences between the present invention and the techniques disclosed in these documents. For example, in A. Sehgal, A. Jagmohan, and N. Ahuja, "Wyner-ziv Coding of Video: An Error-Resilient Compression Framework," *IEEE Trans. on Multimedia*, vol. 6, pp. 249-258, 2004, the authors mark certain frames as "peg" frames. These techniques allow error propagation to occur from one peg frame to the next. At each peg frame, some extra information is sent from the encoder to the decoder which allows the decoder to correct for the errors in the peg frame.

In contrast, aspects of the present invention stop, or reduce, the drift, or errors, as soon as possible. In this way, it is possible to maintain a more or less steady quality which is important from a visual perspective.

On the other hand, in A. Aaron, S. Rane, D. Rebollo-Monedero, and B. Girod, "Systematic Lossy Forward Error Protection for Video Waveforms," in *Proc. IEEE Int. Conf Image Proc.*, 2003, an independent description of the video sequence is sent with each frame, but with coarser quantization. This coarser description is coded using a Wyner-Ziv framework and can be decoded with the help of the erroneous frame at the decoder serving as the side-information. Thus, the method of the above paper does not attempt to stop the drift since at best it can recover the coarse description. The techniques discussed in the above paper also work in the pixel domain and not in the DCT domain, and thus gives up on exploiting the spatial correlations.

For source coding with side information, the encoder needs to encode the source within a distortion constraint, while the decoder needs to be able to decode the encoded codeword subject to the correlation noise N between the source and the side-information. While, the results proven by Wyner and Ziv are non-constructive and asymptotic in nature, a number of constructive methods to solve this problem have since been proposed wherein the source codebook is partitioned into cosets of a channel code that is matched to the correlation noise N. The number of partitions or cosets depends on the statistics of N.

FIG. 1 is a system block diagram illustrating aspects of encoded video over a wireless channel according to one embodiment. The system comprises a predictive encoder 10, including a frame buffer, that communicates a bit-stream to a predictive decoder 20 over a wireless main channel 25, and a secondary channel (WyZER) encoder 30 that communicates a bit-stream to a secondary channel (WyZER) decoder 40 over a wireless secondary channel 45.

In FIG. 1, the predictive decoder 20 receives the bit-stream from the predictive encoder 10 over a wireless main channel 25 and reconstructs a signal $\tilde{X}$ which is a representation of the video signal X input to the encoder 10. The predictive decoder 20 reconstructed bit-stream, $\tilde{X}$, may be affected by errors in transmission of the bit-stream over the wireless channel. The reconstructed signal $\tilde{X}$ serves as side-information to the WyZER decoder 40 which outputs $\hat{X}$ as the final reconstruction.

The input video signal X is the current video signal being encoded by the predictive encoder 10 in one embodiment, the predictive encoder 10 may compress the input video signal and send a compressed bit-stream based on techniques, such as, Motion Estimation (ME) and transforms of Displaced Frame Differences (DFDs). The WyZER encoder 30 sends an independent description of X using a Wyner-Ziv framework to the WyZER decoder 40.

The WyZER decoder 40 then decodes the bit-stream sent over the secondary channel, and using the reconstructed signal $\tilde{X}$, outputs the final reconstruction of the video signal X as $\hat{X}$. The final reconstructed signal $\hat{X}$ will generally be a better reconstruction of the original video signal X than the reconstructed signal $\tilde{X}$ because, as explained further below, the WyZER decoder 40 may be able to correct for some of the errors that occur during transmission of the bit-streams over the wireless channels. The final reconstructed signal $\hat{X}$ may be written back to the frame buffer of the predictive decoder 20.

In this embodiment, for the purpose of designing the WyZER encoder 30, it is assumed that the rate allocated to the WyZER encoder is fixed and that the correlation structure is $X=\tilde{X}+Z$. where X represents the original input signal, $\tilde{X}$ represents the reconstruction of the original signal X by a predictive decoder, and Z represents the correlation noise vector.

Further, in this embodiment, because operations take place in the discrete cosine transform (DCT) domain, it is assumed that the components of the correlation noise vector Z are independent. The components can be modeled as Gaussian distributed because, of all distributions with the same variance, the Gaussian has the maximum entropy and as such provides a worst case analysis. The WyZER encoder 30 needs to find the number of partitions of the source codebook, i.e. the number of cosets, for each component in X, for which it needs to know the variances of each component of Z. To find these variances, correlation estimation techniques can be utilized as described below.

For example, in one embodiment, the correlation estimation algorithm uses some aspects of the algorithm proposed in R. Zhang, S. L. Regunathan, and K. Rose, "Optimal intra/inter mode switching for robust video communication over the Internet," in *Proc. 33rd Ann. Asilomar Conf. on Sig. Syst. Comp.*, 1999. However, unlike the above publication, this embodiment of the present invention is implemented in the DCT domain. For both the main channel and secondary channel, it is assumed that packet erasures on the two channels are independent, and that packets are independently decodable. It is also assumed that the probability of losing a packet is equal to the probability of losing the information for a block. When a block is lost the predictive decoder replaces the block with the block in the frame memory at the same position in a previous frame. The packet loss probability on the main channel and secondary channel are represented as p and q, respectively.

As described in co-pending U.S. patent application Ser. No. 10/396,982, entitled "Method, Apparatus and System for Encoding and Decoding Side Information for Multimedia Transmission" a WyZER encoder can communicate a coset index to the WyZER decoder. The WyZER decoder then decodes the index to identify the coset that includes the codeword that is jointly typical with the side-information. In one embodiment, the concepts detailed in S. S. Pradhan and K. Ramchandran, "Distributed source coding using syndromes (DISCUS): Design and construction," in *Proc. IEEE Data Compression Conf.*, 1999, can be used. In general the source codebook can be partitioned into cosets of any channel code.

Detailed block diagram of the WyZER encoder is shown in FIG. 6. It consists of three blocks, distortion statistics calculator, coset encoder and frame statistics calculator. The WyZER encoder uses the current video frame data and the expected reconstruction of the video frame at the decoder to calculate the statistics of the correlation noise. These statistics are used by the coset encoder to generate the WyZER bitstream. After WyZER encoding the frame statistics are updated so they can be used in the next frame.

FIG. 7 shows the block diagram of the WyZER decoder. The WyZER bits consisting of the coset bits and the coset index information are used along with the side information (from the main decoder) to generate the WyZER decoded output.

Following the notation of R. Zhang, S. L. Regunathan, and K. Rose, "Optimal intra/inter mode switching for robust video communication over the Internet," in Proc. 33rd Ann. Asilomar Conf. on Sig. Syst. Comp., 1999, let $g_n^{i,k}$ be the original value of the $i^{th}$ DCT coefficient in zig-zag scan order in the $k^{th}$ block of the $n^{th}$ frame. And let $\hat{g}_n^{i,k}$ denote its encoder reconstruction, that is $\hat{g}_n^{i,k}$ is the quantized representation of $g_n^{i,k}$. Let this coefficient be re-constructed as $\tilde{g}_n^{i,k}$ by the predictive decoder. The reconstruction $\tilde{g}_n^{i,k}$ is a random variable for the encoder.

Consider the situation when there is no secondary channel. There are two cases—the block is either intra (I block) or inter (predictive, or P block) coded. An I block is self-contained, that is, it includes all of the information needed to render, or display, one complete block of data. A P block is not self-contained and will typically contain differential information relative to the previous frame, such as motion vectors and differential texture information. Consider that p is the probability that a information unit is lost due to channel errors. Further, assume that this region corresponding to the lost information unit is filled by the previously reconstructed, co-located video. Then, if the block was intra-coded, $$\tilde{g}_n^{i,k} = \begin{cases} \hat{g}_n^{i,k}: \text{ with probability } 1-p \\ \tilde{g}_{n-1}^{i,k}: \text{ with probability } p \end{cases} \quad \text{Eq. (1)}$$

And if the block was inter(predictive)-coded, $$\tilde{g}_n^{i,k} = \begin{cases} \tilde{g}_{n-1}^{i,j} + \hat{e}_n^{i,k}: \text{ with probability } 1-p \\ \tilde{g}_{n-1}^{i,k}: \text{ with probability } p \end{cases} \quad \text{Eq. (2)}$$

where $\hat{e}_n^{i,k} = \hat{g}_n^{i,k} - \hat{g}_{n-1}^{i,j} \cdot g_{n-1}^{i,j}$ is the predictor for $g_n^{i,k}$, i.e. the best predictor for the $k^{th}$ block in the $n^{th}$ frame is the $j^{th}$ block in the $(n-1)^{th}$ frame. When a block is lost, it is simply replaced by the block in the same position in the previous frame. It should be noted that even if the predictive bitstream for a particular block is received without errors, $\tilde{g}_n^{i,k}$ may not equal $\hat{g}_n^{i,k}$ the block may nonetheless be in error because there may have been previous errors. The expected distortion for this case is:

$$d_n^{i,k} = E[(g_n^{i,k} - (\tilde{g}_{n-1}^{i,j} + \hat{e}_n^{i,k}))^2] \quad \text{Eq. (3)}$$

The expected distortion, $d_n^{i,k}$, can be calculated for all the DCT coefficients in the block and the WyZER encoder should encode for this correlation. The goal is to refine the erroneously reconstructed DCT coefficients to their error-free quantized representations to stop the drift. However, it may not be possible to encode all the coefficients given the rate constraints of the secondary channel. The right approach here is to use the available rate to refine the subset of DCT coefficients that would minimize the expected distortion. However, it is quite complex to perform this optimization for every block. Based on offline tests it was found that most of the time the best strategy is to refine the lower frequency coefficients before refining the higher frequency coefficients. This also makes intuitive sense from a visual perspective. Thus for the online algorithm, only the m lowest frequency DCT coefficients that can be accommodated within the given rate for the secondary channel were transmitted. For these m DCT coefficients, the WyZER decoder will recover their encoder reconstructions at the decoder when both the Main and WyZER streams get through. Thus for these m DCT coefficients, the reconstruction at the decoder will be:

$$\tilde{g}_n^{i,k} = \begin{cases} \hat{g}_n^{i,k}: \text{ with probability } (1-p)(1-q) \\ \tilde{g}_{n-1}^{i,j} + \hat{e}_n^{i,k}: \text{ with probability } q(1-p) \\ \tilde{g}_{n-1}^{i,k}: \text{ with probability } p \end{cases} \quad \text{Eq. (4)}$$

For the remaining DCT coefficients that are not encoded by the WyZER encoder, $\tilde{g}_n^{i,k}$ is given by Equation (2) above.

To compute the expected distortion $d_n^{i,k}$ using Equation (3), it is needed to compute $E[\tilde{g}_{n-1}^{i,j}]$ and $E[(\tilde{g}_{n-1}^{i,j})^2]$ (because $\hat{e}_n^{i,k}$ and $g_n^{i,k}$ are already known at the encoder). Equations (1), (2), and (4) can be used to relate $E[\tilde{g}_{n-1}^{i,j}]$ and $E[(\tilde{g}_{n-1}^{i,j})^2]$ to $E[\tilde{g}_{n-2}^{i,j}]$ and $E[(\tilde{g}_{n-2}^{i,j})^2]$. Thus the WyZER encoder can compute $E[\tilde{g}_{n-1}^{i,j}]$ and $E[(\tilde{g}_{n-1}^{i,j})^2]$ using a simple recursive algorithm (similar to that used by R. Zhang, S. L. Regunathan, and K. Rose, "Optimal intra/inter mode switching for robust video communication over the Internet,"," in Proc. 33rd Ann. Asilomar Conf. on Sig. Syst. Comp., 1999) and thus compute $d_n^{i,k}$ using Equation (3). Note that for the purpose of encoding, the predictive encoder divides the frame into a grid of non-overlapping spatial blocks. If the predictor block (the $j^{th}$ block in the $(n-1)^{th}$ frame in the above analysis) does not align with this grid of non-overlapping blocks, the WyZER encoder would not have stored the values of $E[\tilde{g}_{n-1}^{i,j}]$ and $E[(\tilde{g}_{n-1}^{i,j})^2]$ while encoding the $(n-1)^{th}$ frame (since j is not a valid block in the $(n-1)^{th}$ frame). In this case, the block with the maximum overlap to the $j^{th}$ block in the $(n-1)^{th}$ frame that is a valid block is used in calculation. Instead, a weighted average of the corresponding blocks in the $(n-1)^{th}$ frame overlapping the $j^{th}$ block can also be used.

The correlation noise estimate ($d_n^{i,k}$) determines the number of partitions of the source codebook or number of cosets. This information, the number of cosets, may be communicated to the WyZER decoder over the secondary channel in the form of header information. To restrict the size of the header, the possible value that the number of cosets can take, may be limited, for each coefficient. The limit on the possible values may be based on extensive tests.

FIGS. 2(a)-(f) are graphs of simulation results for various performance comparisons that demonstrate the effectiveness of the WyZER codec described above. For the simulations, standard video sequences, that are well known to those in the art, were encoded with an H.263+ coder used as the predictive video codec. The secondary channel is allocated about 30% of the rate on the main channel.

Figure 2A:
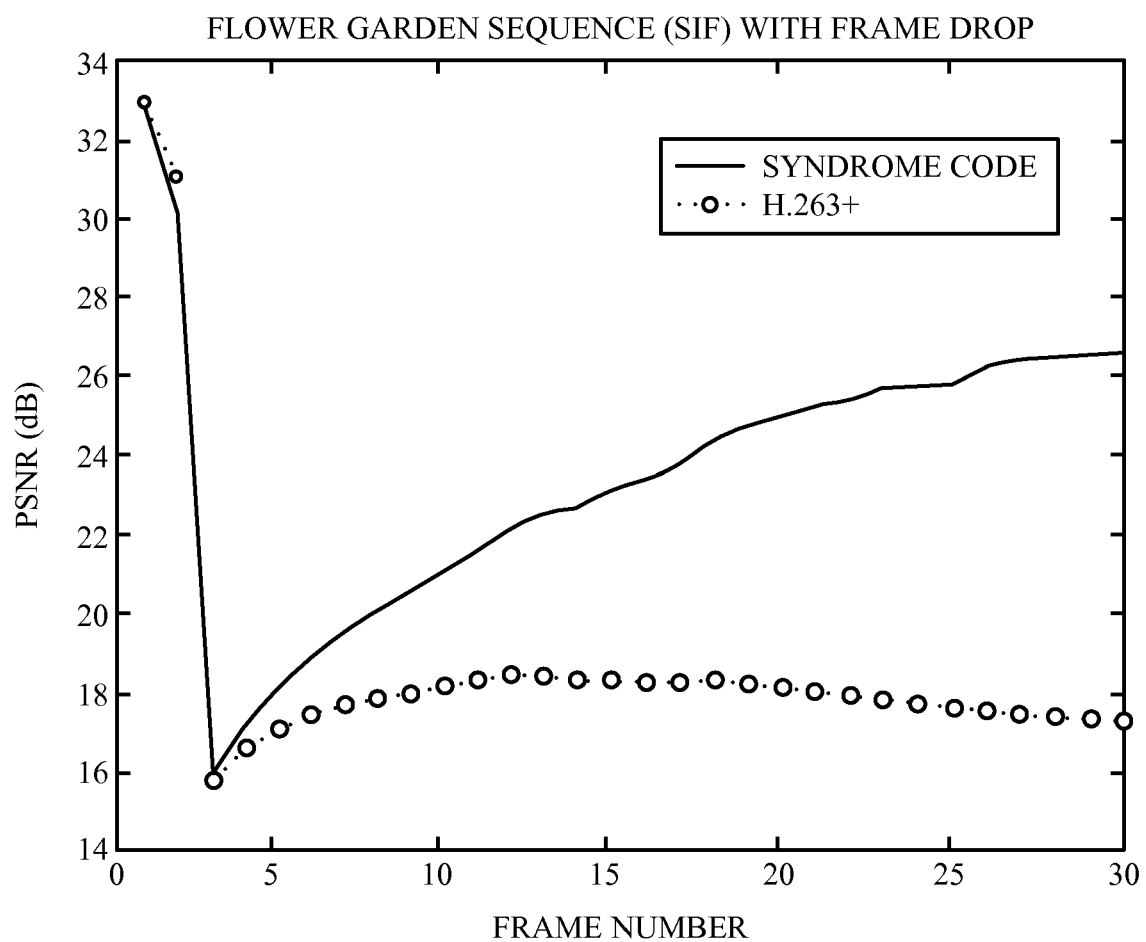
FIG. 2(a) is a plot of the peak signal to noise ratio (PSNR) verses frame number for a video sequence encoded with an H.263+ encoder and with DSC techniques.

FIG. 2(a) is a plot of the peak signal to noise ratio (PSNR) verses frame number for a video sequence encoded with an H.263+ encoder 202 and the DSC techniques 204 described above. In FIG. 2 (a), the 3rd frame of the standard "Flower Garden" video sequence (352×240, 15 fps, 1 intra frame followed by 29 inter frames) was dropped. To make the comparison fair, H.263+ is compensated with the same amount of extra rate. FIG. 2(a) shows that with the DSC techniques, the PSNR increases steadily following the dropped frame, as the drift is corrected, to about 7-8 dB better than H.263+ by the end of the thirty frames sequence.

The DSC techniques described above were also tested using a wireless channel simulator that adds packet errors to multimedia data streams transmitted over wireless networks conforming to the CDMA 2000 1X standard 5. For these tests, the DSC technique was modified to allow a portion of the rate on the secondary channel to be allocated to forward correcting codes (FECs) and the remaining portion to be allocated to the WyZER stream. A motivation for this, is that the WyZER stream cannot recover from loss instantaneously (see FIG. 2(a)), unlike in the case when FEC is used and the number of erasures is less than the FEC's correction capability. This is important from both visual and PSNR perspectives. However, the entire rate on the side-channel is not allocated to FECs because, as mentioned before, it cannot guarantee error recovery. This is especially true for wireless channels which often have significant error bursts.

Figure 2B:
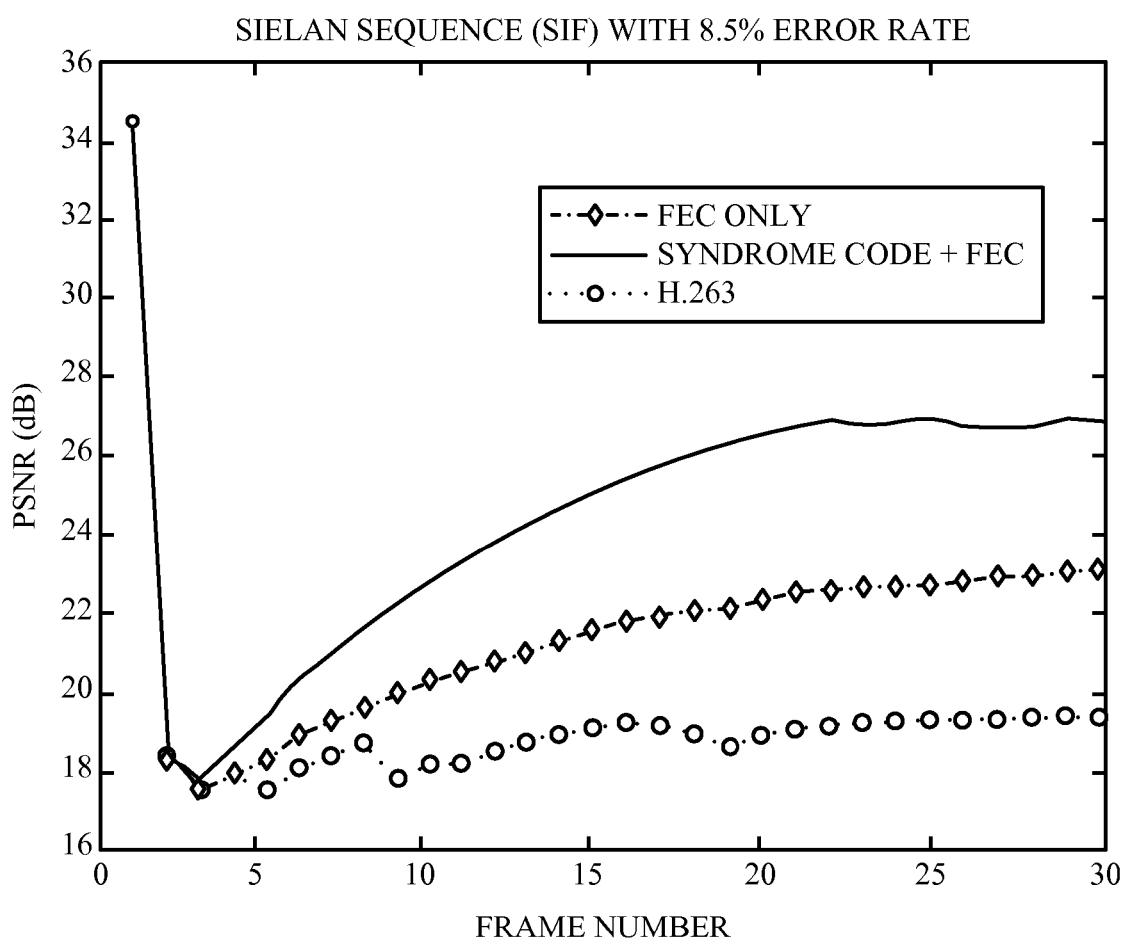
FIG. 2(b) is a plot of the PSNR verses frame number for the a video sequence encoded with an H.263+ encoder, with FEC, and with DSC techniques.

FIG. 2(b) is a plot of the PSNR verses frame number for the a video sequence encoded with an H.263+ encoder 212, FEC 214, and a DSC technique 216 described above. The standard video sequence used in generating FIG. 2(b) was the "Stefan" video sequence (both 352×240, 15 fps, 1 GOP). In FIG. 2(b) the three different encoding techniques compared are:

1) H.263+ encoded at a rate equal to the total allocated to the main and secondary channels (curve 212),
2) Full secondary channel rate allocated to FEC (we use Reed-Solomon codes) (curve 214), and
3) Proposed algorithm, modified by allocating part of the rate on the secondary channel to FEC (again RS codes are used) (curve 216).

For both the FEC and DSC techniques, (2) and (3) above, the latency constraint is 1 frame. Tests were conducted to find the optimal rate partition between FEC and the WyZER stream in the case of (3). In most cases it was best to allocate roughly equal rates to FEC and the WyZER stream and this is the setup for the results presented here. The Main and WyZER streams are sent over the same (simulated) wireless channel.

In the case of the Stefan sequence shown in FIG. 2 (b), the proposed WyZER 216 approach outperforms the others, achieving an average PSNR that is 2.9 dB higher than the FEC-only case 214, and 5.2 dB higher than baseline H.263+, (curve 212).

Figure 2C:
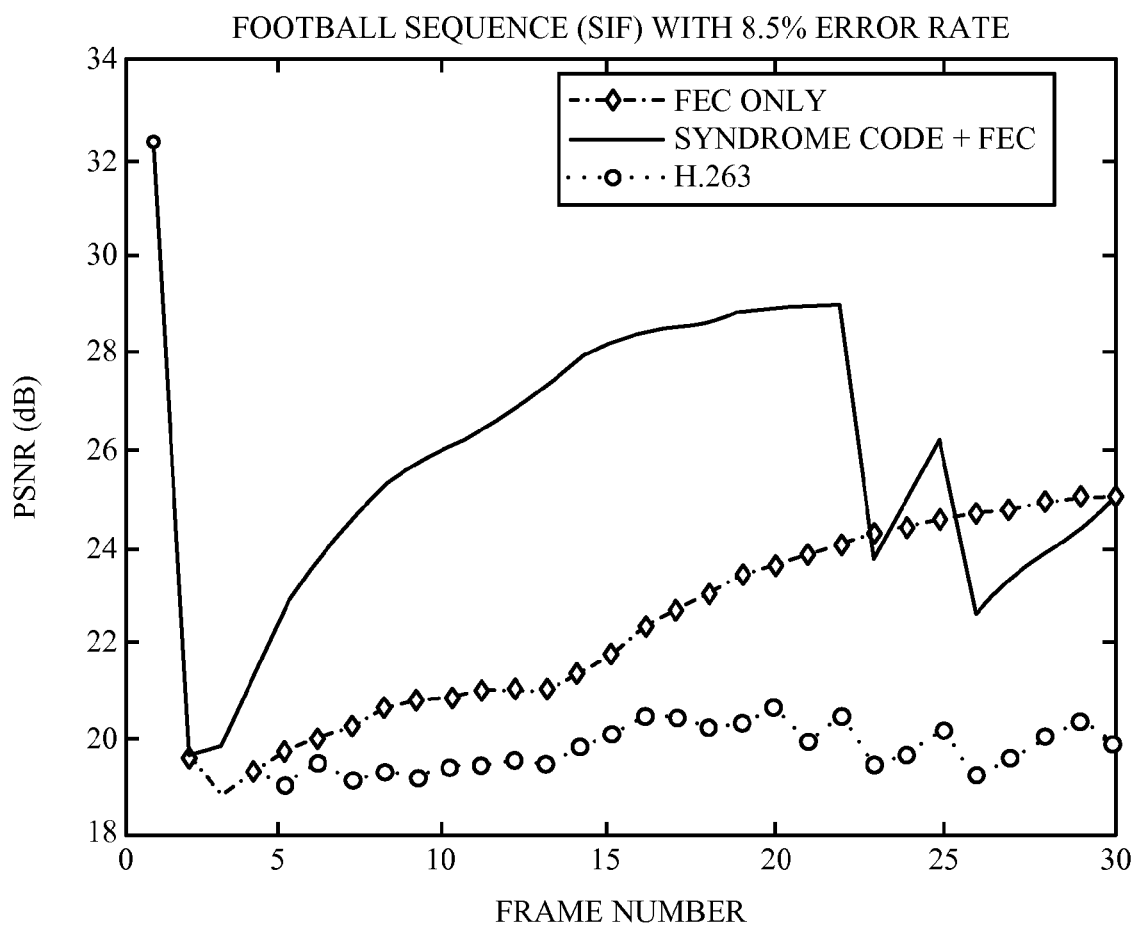
FIG. 2(c) is a plot of the PSNR verses frame number for another video sequence encoded with an H.263+ encoder, with FEC, and with DSC techniques.

FIG. 2(c) is a plot of the PSNR verses frame number for another video sequence encoded with an H.263+ encoder 222, FEC 224, and a WyZER technique 226 described above. The standard video sequence used in generating FIG. 2(c) was the "Football" video sequence (both 352×240, 15 fps, 1 GOP). FIG. 2(c) show the typical performance of the three encoding schemes for the Stefan and Football sequences (both 352×240, 15 fps, 1 GOP), for a packet loss rate of 8.5%.

In FIG. 2(c), the PSNR of the proposed DSC technique 226 takes two dips in Frame 23 and 26, but in both cases it recovers quickly. The average PSNR for the WyZER technique 226 for this test is 3.1 dB higher than the FEC only case 224, and 5.6 dB higher than baseline H.263+ (curve 222).

Figure 2D:
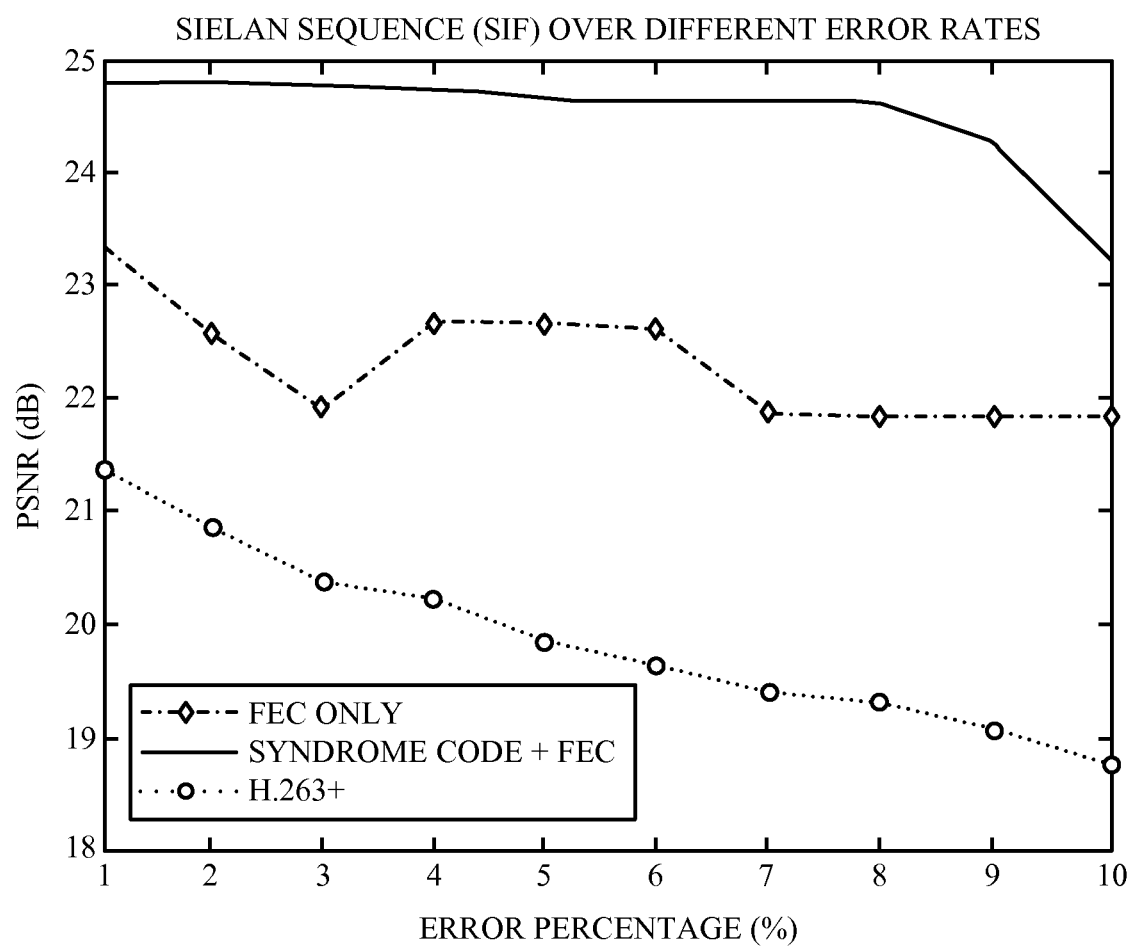
FIG. 2(d) is a plot of PSNR verses error percentage for a video sequence entitled "Stefan" encoded with an H.263+ encoder, with FEC, and with DSC techniques.
Figure 2E:
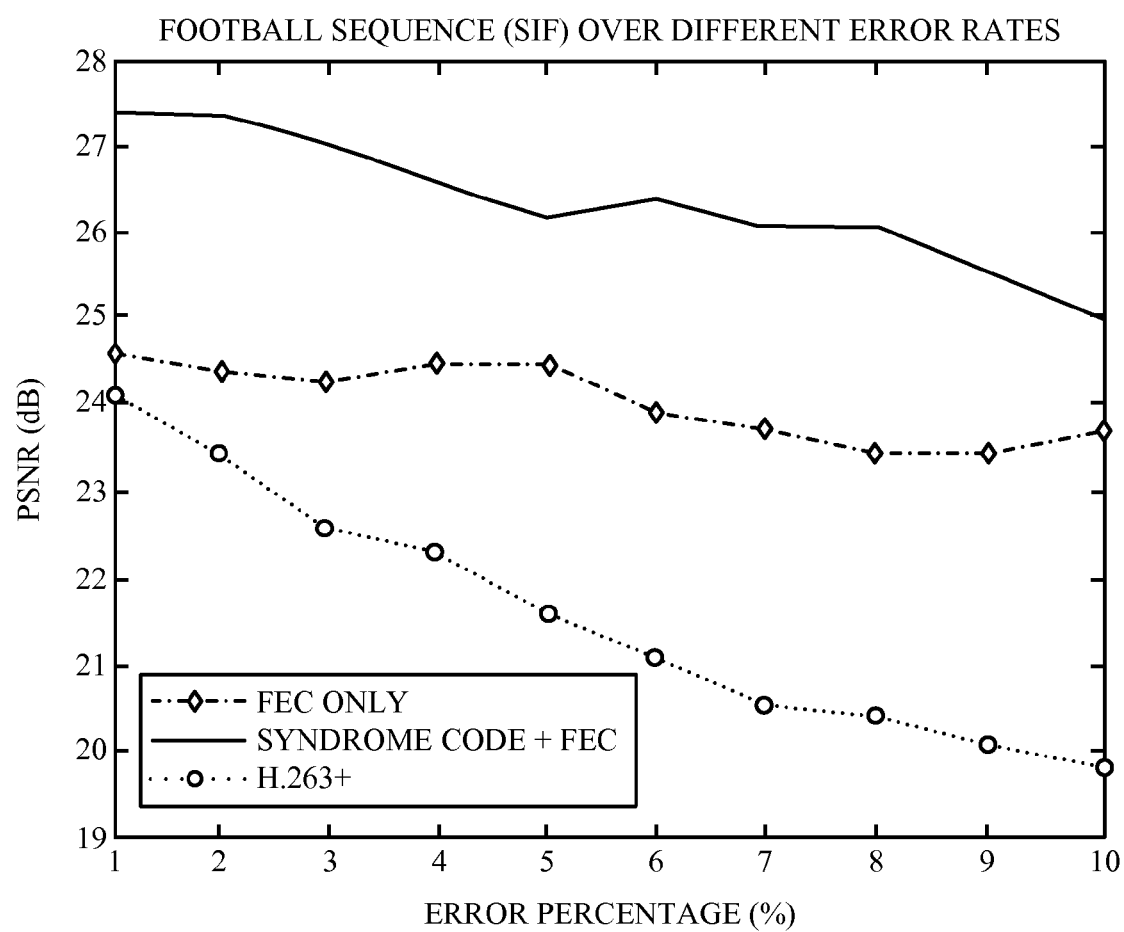
FIG. 2(e) is a plot of PSNR verses error percentage for a video sequence entitled "Football" encoded with an H.263+ encoder, with FEC, and with DSC techniques.

FIG. 2(d) is a plot of PSNR verses error percentage for the video sequence "Stefan" encoded with an H.263+ encoder 232, FEC 234, and a DSC technique 236. FIG. 2(e) is a plot of PSNR verses error percentage for the video sequence "Football" encoded with an H.263+ encoder 242, FEC 244, and a DSC technique 246. As illustrated in FIGS. 2(d) and 2(e), for the typical performance of the three methods of encoding, the methods of the present invention consistently outperform the other two. Though results are presented only for SIF (352× 240) sequences, similar behaviors are observed for video sequences of other spatial sizes, such as, QCIF, CIF.

Figure 2F:
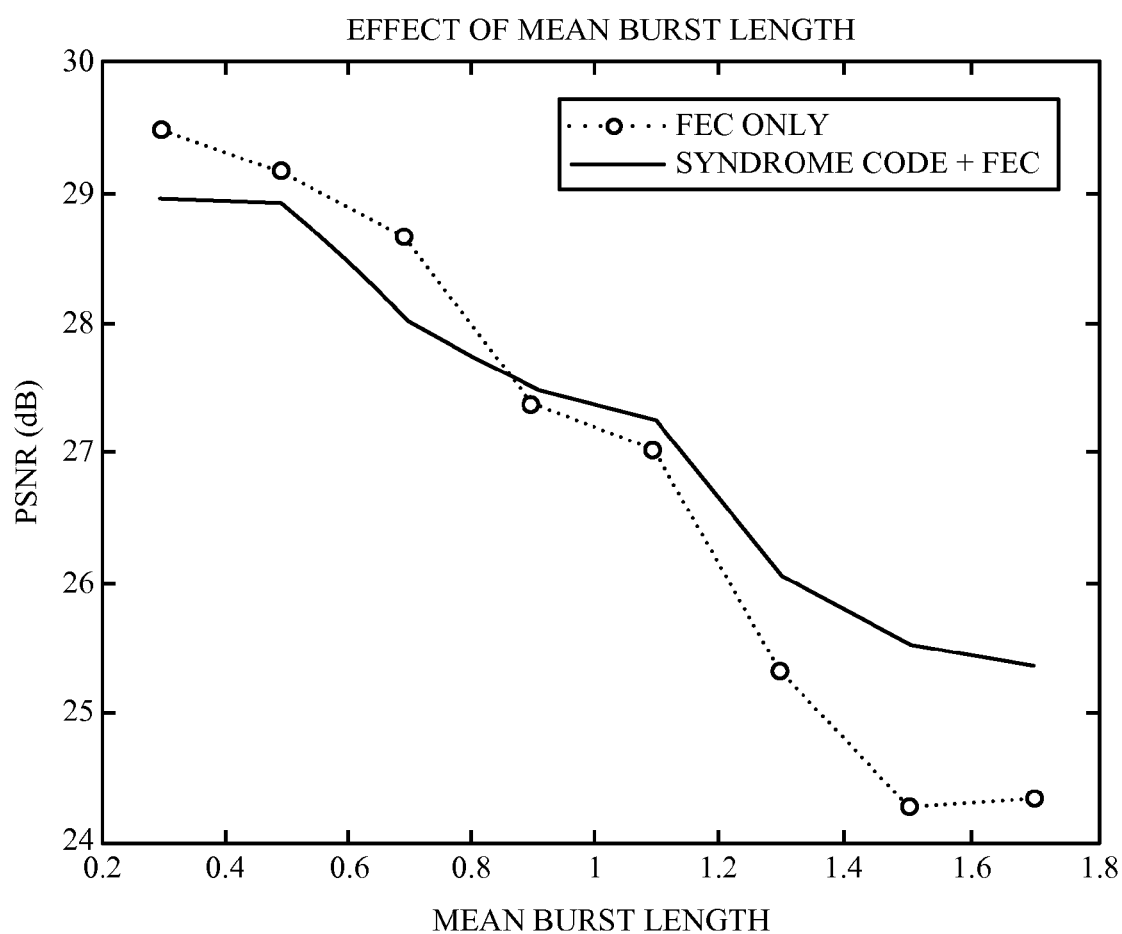
FIG. 2(f) is a plot of PSNR verses mean burst length for the "Football" video sequence encoded with FEC and with DSC techniques.

Experiments have also been conducted to study the effect of burst length on performance. FIG. 2(f) is a plot of PSNR verses mean burst length for the "Football" video sequence (176×144, 15 fps, 30 frames) encoded with FEC 252 and DSC 254. As illustrated in FIG. 2(f), when mean burst length is greater than 0.6, the techniques according to the present invention 254 outperform the FEC-only 252 case, but when the burst length is smaller than 0.6, it is inferior to the FEC only case.

Thus, simulation results using techniques described above show significant gains in performance over conventional error protection schemes such as Forward Error Correction codes under reasonable latency constraints.

The DSC techniques described may operate with a number of wireless devices and wireless standards. Examples of wireless devices that can implement the DSC techniques described include cellular telephones, wireless communication enabled personal computers, and personal digital assistants (PDA), and other wireless devices. Example of wireless standards that the DSC techniques described can be operated on include standards referred to as Global System for Mobile Communication (GSM), General Packet Radio Service (GPRS), Enhanced Data GSM Environment (EDGE), TIA/EIA-95-B (IS-95), TIA/EIA-98-C (IS-98), CDMA2000, Wideband CDMA (WCDMA), and others.

Figure 3:
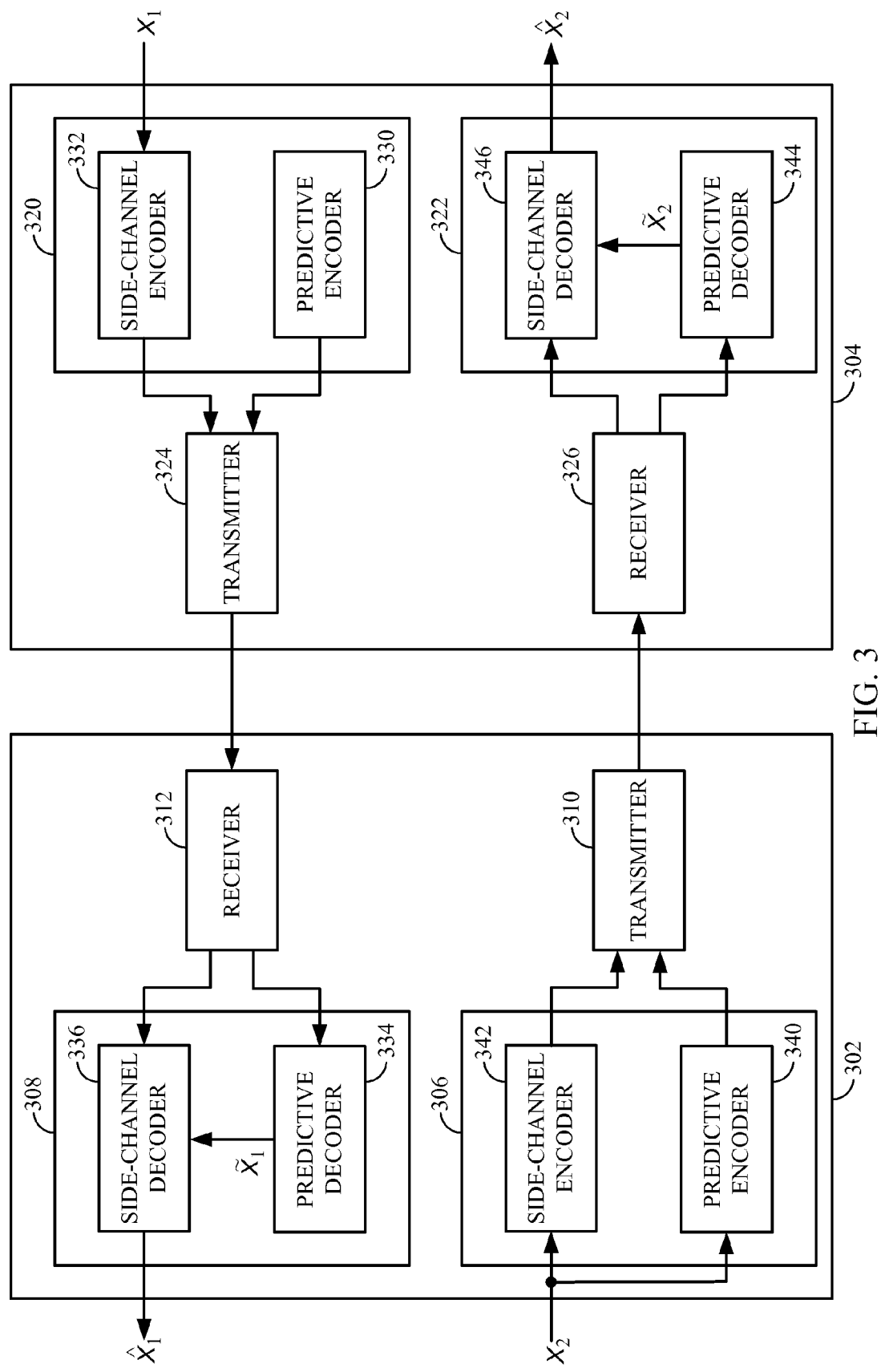
FIG. 3 is a block diagram illustrating portions of a wireless communication system that can implement the DSC techniques.

FIG. 3 is a block diagram illustrating portions of a wireless communication system that can implement the DSC techniques. As shown in FIG. 1, the wireless communication system includes a first wireless communication device (WCD) 302, also referred to as a mobile station (MS). The wireless communication system includes a second wireless device 304, that can be part of a wireless infrastructure, another wireless device, or a landline device that is connected to a wireless infrastructure.

The first wireless device 302 includes a WyZER encoder 306, a WyZER decoder 308, a transmitter 310 and a receiver 312. The second wireless device 304 includes a WyZER encoder 320, a WyZER decoder 322, a transmitter 324 and a receiver 324. The second wireless device 304 may receive an input signal $X_1$, for example, a video signal. The input signal $X_1$ is connected to the DSC encoder 320. Included within the DSC encoder 320 there is a predictive encoder 330 and a WyZER encoder 332. The input signal is encoded in accordance with the DSC techniques described, and a Main stream and WyZER stream are output from the predictive encoder 320 and the WyZER encoder 332 to the transmitter 324.

The Main and WyZER streams are transmitted over a wireless communication channel (multiple logical channels can be used to transmit the two streams) to the receiver 312 in the first wireless device 302. The Main stream is output from the receiver 312 to a predictive decoder 334 within the DSC decoder 308 in the first wireless device 302. The WyZER stream is output from the receiver 312 to a WyZER decoder 336. The output $\hat{X}_1$ of the predictive decoder 334 is also input to the WyZER decoder 336. In accordance with the DSC techniques described the predictive and WyZER decoders cooperate to produce and output a reconstruction signal $\hat{X}_1$ of the input signal $X_1$.

In a similar manner to that just described, the first wireless device may receive an input signal $X_2$ that is encoded by a predictive encoder 340 and a WyZER encoder 342 included within the DSC encoder 306 in the first wireless device 302. Main and WyZER streams are output from the DSC encoder 306 to the transmitter 310. The receiver 326 in the second wireless device 304 receives the bit-streams and outputs the predictive bit-stream to a predictive decoder 344 and the WyZER stream to a WyZER decoder 346 in the DSC decoder 322 in the second wireless device 304. The output $\hat{X}_2$ of the predictive decoder 344 is also input to the WyZER decoder 346. In accordance with the DSC techniques described the predictive and WyZER decoders cooperate to produce and output a reconstruction signal $\hat{X}_2$ of the input signal $X_2$.

In another embodiment, a wireless device may include only a DSC encoder or only a DSC decoder. For example, if a device is configured to broadcast, or transmit, encoded data but not to receive encoded data, then it may have a DSC encoder to encode the broadcast data but it may not have a DSC decoder because it does not receive encoded data. Likewise, a device configured to receive and decode a signal, but not to transmit an encoded signal, may include a decoder but not an encoder. An example of this type of system would be a broadcast system, such as a video broadcast system, where the broadcaster transmits encoded data to at least one user, and typically to many users, but the users do not transmit encoded data back to the broadcaster. In this example, the broadcaster wireless device would include a DSC encoder to encode the broadcast data, and the user wireless device would include a DSC decoder to decode the received encoded broadcast.

Figure 4:
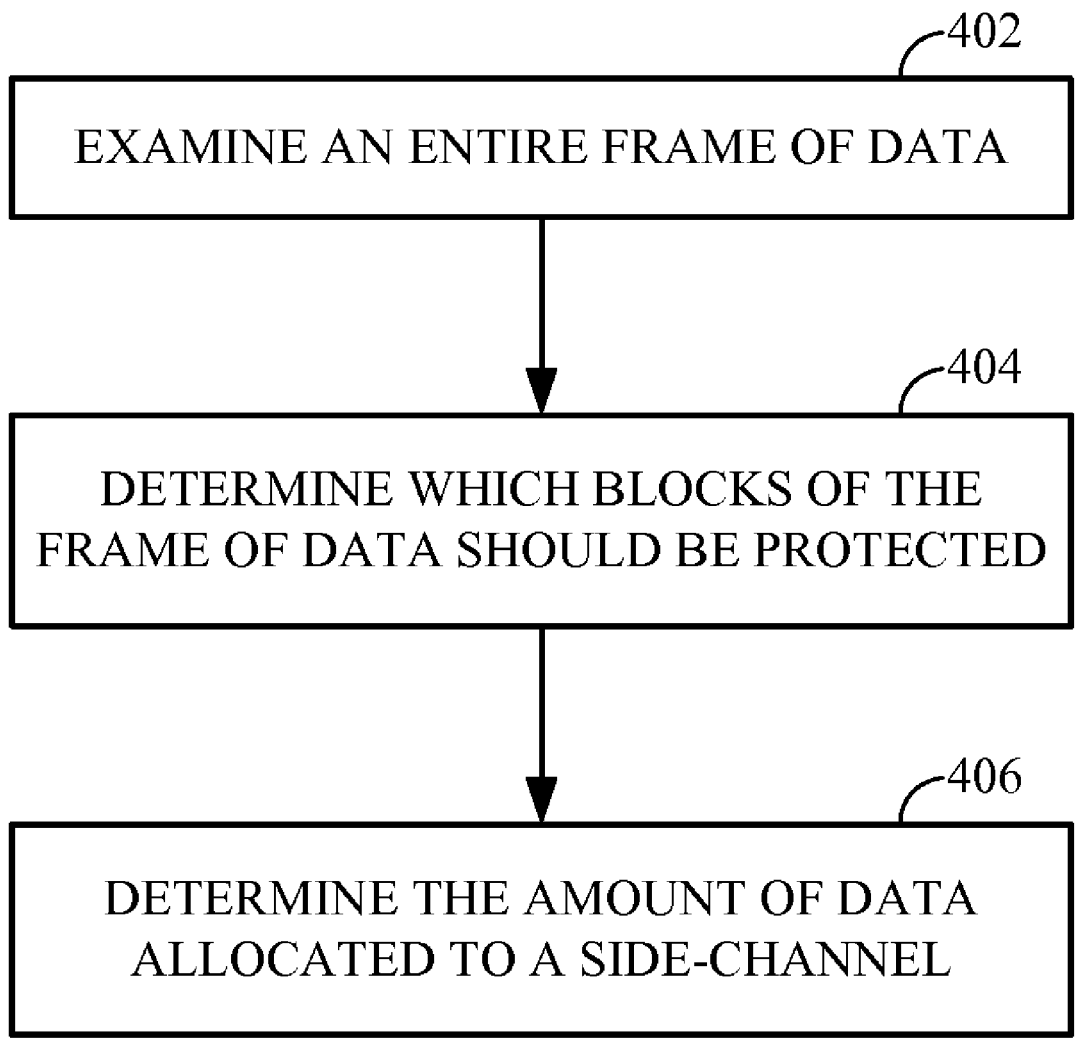
FIG. 4 is a flow diagram illustrating an embodiment for determining intra-frame bit allocation to a side-channel encoder.

FIG. 4 is a flow diagram illustrating an embodiment for determining intra-frame bit allocation to a WyZER encoder. Flow begins in block 402 where an entire frame of data, that is partitioned into data blocks, is examined. Flow continues to block 404 where it is determined which of the data blocks should be protected. For example, the data blocks may be "ranked" based on the deleterious effect that the loss of the individual data block would have on a reconstruction of the frame of data at a receiver if the particular block is lost or corrupted. The blocks whose loss would be more harmful to the reconstruction having a higher rank.

Flow continues to block 406 where an amount of data to be allocated to a WyZER encoder is determined. In general, it is desirable to allocate a minimum amount of data allocated to the secondary channel because the amount of data allocated has to be transmitted over the secondary channel thereby consuming additional system resources. Thus, more data will be allocated to, and transmitted over, the secondary channel depending on how desirable it is to protect a particular data block. For example, if a data block is "ranked" high, more data may be allocated to, and transmitted over, the secondary channel for that block than to a block that is "ranked" lower.

Figure 5:
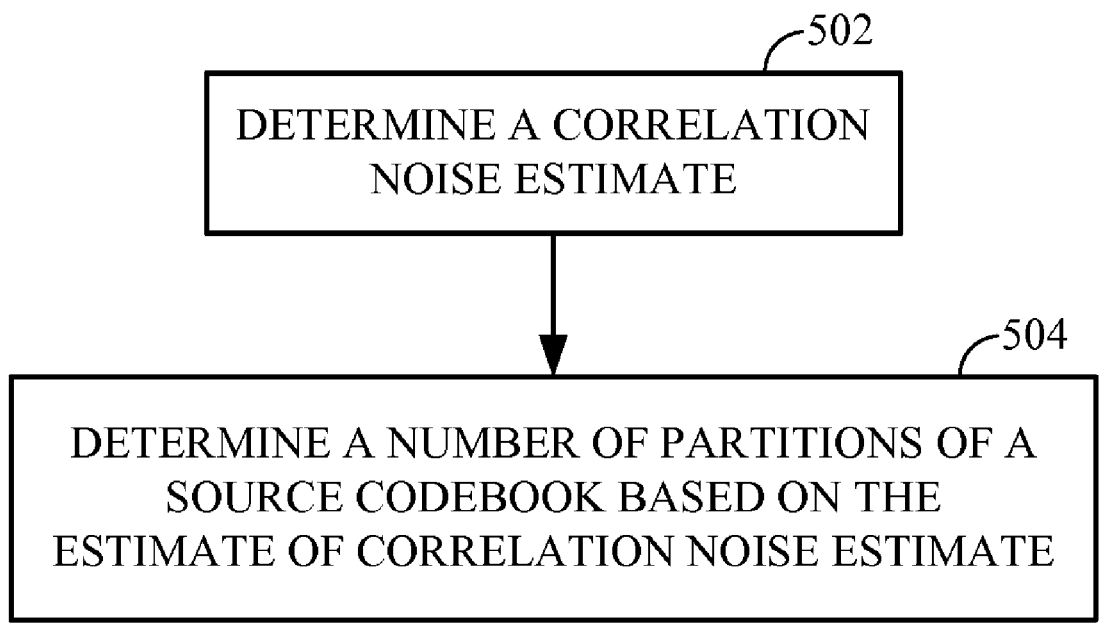
FIG. 5 is a flow chart illustrating an embodiment of determining a maximum number of partitions of a source codebook that will be used by a side-channel encoder.

FIG. 5 is a flow chart illustrating an embodiment of determining a maximum number of partitions of a source codebook that will be used by a WyZER encoder. Flow begins in block 502 where a correlation noise estimate is determined. For example, the correlation noise of a transform coefficient may be determined for the case where a predictive bit-stream, representing a block of data, is successfully transmitted from a predictive encoder to a predictive decoder. Even though the block is successfully transmitted, the decoded block may have errors due to errors in previous blocks. Flow continues to block 504 where the number of partitions of a source codebook, used to represent the data block, is determined. The number of partitions of the source codebook is also referred to as coset.

In one embodiment, the number of cosets may be communicated to a WyZER decoder over a wireless secondary channel communication in a header of the WyZER stream.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication device comprising:
   a predictive decoder configured to receive an inter-predictive encoded bit-stream representative of an original signal, decode the inter-predictive encoded bit-stream according to a predictive decoding technique, and output a reconstructed signal; and
   a secondary channel decoder configured to receive a secondary channel encoded bit-stream, the reconstructed signal, and information that includes the number of cosets used for encoding the secondary channel encoded bit-stream,
   wherein the secondary channel encoded bit-stream is representative of the original signal,
   wherein the number of cosets used for encoding the secondary channel encoded bit-stream is based on a correlation noise estimate for a video block calculated during encoding of the secondary channel encoded bit-stream based on data associated with the video block and a packet loss probability, and
   wherein the secondary channel decoder is further configured to decode the secondary channel encoded bit-stream, based on the number of cosets used for encoding the secondary channel encoded bit-stream, according to a secondary channel decoding technique, and combine the decoded secondary channel encoded bit-stream and the reconstructed signal to generate and output a final reconstruction of the original signal.

2. A wireless communication device as defined in claim 1, wherein the inter-predictive encoded bit-stream is received over a main communication channel.

3. A wireless communication device as defined in claim 1, wherein the secondary channel encoded bit-stream is received over a secondary channel communication channel.

4. A wireless communication device as defined in claim 1, wherein the predictive decoding technique is a technique compatible with MPEG-4 standard.

5. A wireless communication device as defined in claim 1, wherein the predictive decoding technique is a technique compatible with H.26x standard.

6. A wireless communication device as defined in claim 1, wherein the secondary channel decoding technique is a technique compatible with Wyner Ziv techniques.

7. A wireless communication device as defined in claim 1, wherein the original signal is a video signal.

8. A wireless communication device as defined in claim 1, wherein the original signal comprises intra-coded blocks of data and inter-coded blocks of data.

9. A wireless communication device as defined in claim 8, wherein Wyner-Ziv techniques are applied to the inter-coded data blocks.

10. A wireless communication device as defined in claim 1, wherein the number of cosets is included within a header of the secondary channel encoded bit-stream.

11. The wireless communication device as defined in claim 1, further comprising a receiver that receives the predictive encoded bit-stream and the secondary channel encoded bit-stream over a single wireless communication channel, and transmits the predictive encoded bit-stream to the predictive decoder and the secondary channel encoded bit-stream to the secondary channel decoder.

12. The wireless communication device as defined in claim 11,
   wherein the predictive encoded bit-stream is received from a first logical channel within the single wireless communication channel, and
   wherein the secondary channel encoded bit-stream is received from a second logical channel within the single wireless communication channel.

13. The wireless communication device as defined in claim 1, wherein the inter-predictive encoded bit-stream is received from a main communication channel, and wherein the packet loss probability comprises a probability of losing a packet over the main communication channel.

14. The wireless communication device as defined in claim 1, wherein the secondary channel encoded bit-stream is received from a secondary communication channel, and wherein the packet loss probability comprises a probability of losing a packet over the secondary communication channel.

15. The wireless communication device as defined in claim 1, wherein the correlation noise estimate comprises an expected distortion that is calculated based on the data associated with the video block and an expected reconstructed predictor block, and wherein the expected reconstructed predictor block is calculated during encoding of the secondary channel encoded bit-stream based on the packet loss probability.

16. The wireless communication device as defined in claim 15, wherein the expected reconstructed predictor block comprises expected reconstructed discrete cosine transform (DCT) coefficients that are calculated during encoding of the secondary channel encoded bit-stream based on the packet loss probability.

17. A method of decoding data, the method comprising:
   receiving an inter-predictive encoded bit-stream representative of an original signal;
   decoding the inter-predictive encoded bit-stream according to a predictive decoding technique, and outputting a reconstructed signal;
   receiving a secondary channel encoded hit-stream, the reconstructed signal, and information that includes the number of cosets used for encoding the secondary channel encoded bit-stream, wherein the secondary channel encoded bit-stream is representative of the original signal, and wherein the number of cosets used for encoding the secondary channel encoded bit-stream is based on a correlation noise estimate for a video block calculated during encoding of the secondary channel encoded bit-stream based on data associated with the video block and a packet loss probability; and
   decoding the secondary channel encoded bit-stream, based on the number of cosets used for encoding the secondary channel encoded bit-stream, according to a secondary channel encoding technique, and combining the decoded secondary channel encoded bit-stream and the reconstructed signal to generate and output a final reconstruction of the original signal.

18. A method of decoding as defined in claim 17, wherein the predictive decoding technique is a technique compatible with MPEG-4 standard.

19. A method of decoding as defined in claim 17, wherein the predictive decoding technique is a technique compatible with H.26x standard.

20. A method of decoding as defined in claim 17, wherein the secondary channel decoding technique is a technique compatible with Wyner Ziv techniques.

21. A method of decoding as defined in claim 17, wherein the original signal is a video signal.

22. A method of decoding as defined in claim 17, wherein the original signal comprises intra-coded blocks of data and inter-coded blocks of data.

23. A method of decoding as defined in claim 22, wherein Wyner Ziv techniques are applied to the inter-coded data blocks.

24. A method of decoding as defined in claim 17, wherein the number of cosets is included within a header of the secondary channel encoded bit-stream.

25. A non-transitory computer-readable medium comprising instructions that upon execution by a processor cause the processor to:
receive a first bit-stream representative of an original signal, wherein the first bit-stream is an inter-predictive encoded bit-stream;
decode the first bit-stream according to a predictive decoding technique, and output a reconstructed signal;
receive a second bit-stream, the reconstructed signal, and information that includes the number of cosets used for encoding the second bit-stream, wherein the second bit-stream is representative of the original signal, and wherein the number of cosets used for encoding the second bit-stream is based on a correlation noise estimate for a video block calculated during encoding of the second bit-stream based on data associated with the video block and a packet loss probability; and
decode the second bit-stream, based on the number of cosets used for encoding the second bit-stream, according to a secondary channel decoding technique, and combine the decoded second bit-stream and the reconstructed signal to generate and output a final reconstruction of the original signal.

26. The non-transitory computer-readable medium as defined in claim 25, wherein the first bit-stream is encoded according to a predictive encoding technique.

27. The non-transitory computer-readable medium as defined in claim 25, wherein the second bit-stream is encoded according to a secondary channel encoding technique.

28. A wireless communication device comprising:
means for receiving a first bit-stream representative of an original signal, wherein the first bit-stream is an inter-predictive encoded bit-stream;
means for decoding the first bit-stream according to a predictive decoding technique, and outputting a reconstructed signal;
means for receiving a second bit-stream, the reconstructed signal, and information that includes the number of cosets used for encoding the second bit-stream, wherein the second bit-stream is representative of the original signal, and wherein the number of cosets used for encoding the second bit-stream is based on a correlation noise estimate for a video block calculated during encoding of the second bit-stream based on data associated with the video block and a packet loss probability; and
means for decoding the second bit-stream, based on the number of cosets used for encoding the second bit-stream, according to a secondary channel encoding technique, and combining the decoded second bit-stream and the reconstructed signal to generate and output a final reconstruction of the original signal.

* * * * *